United States Patent
Hird et al.

(10) Patent No.: US 10,460,314 B2
(45) Date of Patent: Oct. 29, 2019

(54) PRE-GENERATION OF SESSION KEYS FOR ELECTRONIC TRANSACTIONS AND DEVICES THAT PRE-GENERATE SESSION KEYS FOR ELECTRONIC TRANSACTIONS

(71) Applicant: CA, Inc., Islandia, NY (US)

(72) Inventors: Geoffrey R. Hird, Cupertino, CA (US); Douglas N. Hoover, Sunnyvale, CA (US)

(73) Assignee: CA, Inc., New York, NY (US)

( * ) Notice: Subject to any disclaimer, the term of this patent is extended or adjusted under 35 U.S.C. 154(b) by 1334 days.

(21) Appl. No.: 13/938,987

(22) Filed: Jul. 10, 2013

(65) Prior Publication Data
US 2015/0019442 A1    Jan. 15, 2015

(51) Int. Cl.
*G06Q 20/38* (2012.01)
*H04L 29/06* (2006.01)
*H04W 12/04* (2009.01)

(52) U.S. Cl.
CPC ....... *G06Q 20/3829* (2013.01); *H04L 63/062* (2013.01); *H04W 12/04* (2013.01); *H04L 63/12* (2013.01); *H04L 2463/061* (2013.01); *H04L 2463/062* (2013.01)

(58) Field of Classification Search
None
See application file for complete search history.

(56) References Cited

U.S. PATENT DOCUMENTS

| | | | | |
|---|---|---|---|---|
| 5,164,988 A | * | 11/1992 | Matyas | G06F 21/79 380/279 |
| 5,200,999 A | * | 4/1993 | Matyas | H04L 9/088 380/277 |
| 5,319,710 A | * | 6/1994 | Atalla | G06Q 20/401 380/281 |
| 5,613,012 A | * | 3/1997 | Hoffman | G06F 21/32 235/380 |

(Continued)

FOREIGN PATENT DOCUMENTS

WO    WO 2010/081218 A1    7/2010

OTHER PUBLICATIONS

ANS X9.24-1: 2009. Retail Financial Services Symmetric Key Management. Part 1: Using Symmetric Techniques, Oct. 13, 2009, XP009146400.*

(Continued)

*Primary Examiner* — Mamon Obeid

(57) ABSTRACT

Methods and devices for pre-generating session keys for securing transactions are provided. A plurality of session cryptographic keys are generated from a master cryptographic key and a respective plurality of possible values of a transaction counter. The session cryptographic keys are encrypted to provide a plurality of encrypted session cryptographic keys, which are stored in the user terminal. The master cryptographic key is deleted from the user terminal after the session keys are generated. To secure a transaction, a cryptogram is generated based on one of the encrypted session cryptographic keys and transaction data for the transaction, and the cryptogram is transmitted to a transac- (Continued)

tion terminal. The transaction counter is updated, and the encrypted session cryptographic key is deleted from the user terminal.

14 Claims, 7 Drawing Sheets

(56) References Cited

U.S. PATENT DOCUMENTS

| | | | | |
|---|---|---|---|---|
| 5,682,428 A * | 10/1997 | Johnson | G06F 21/606 | 705/12 |
| 5,825,880 A * | 10/1998 | Sudia | G06F 21/40 | 713/180 |
| 5,892,900 A * | 4/1999 | Ginter | G06F 21/10 | 726/26 |
| 5,901,285 A * | 5/1999 | Labatte | G06F 12/1466 | 711/E12.094 |
| 6,134,660 A * | 10/2000 | Boneh | G06F 21/6209 | 380/201 |
| 6,292,899 B1 * | 9/2001 | McBride | G06F 21/6209 | 380/281 |
| 6,484,182 B1 * | 11/2002 | Dunphy | G06Q 10/06 | 707/999.102 |
| 6,961,858 B2 * | 11/2005 | Fransdonk | G06F 21/10 | 380/281 |
| 7,020,635 B2 * | 3/2006 | Hamilton | G06Q 20/00 | 705/51 |
| 7,080,049 B2 * | 7/2006 | Truitt | G06Q 20/16 | 380/30 |
| 7,090,128 B2 * | 8/2006 | Farley | H04L 67/2823 | 235/384 |
| 7,107,462 B2 * | 9/2006 | Fransdonk | G06Q 20/12 | 380/282 |
| 7,150,045 B2 * | 12/2006 | Koelle | G06F 21/552 | 726/26 |
| 7,587,502 B2 * | 9/2009 | Crawford | A63F 13/12 | 709/229 |
| 7,711,586 B2 * | 5/2010 | Aggarwal | G06Q 10/02 | 705/5 |
| 7,747,021 B2 * | 6/2010 | Lindteigen | H04L 29/06027 | 380/274 |
| 8,087,074 B2 * | 12/2011 | Popp | H04L 9/3228 | 726/9 |
| 8,207,817 B2 * | 6/2012 | Kamiya | G07C 9/00309 | 340/5.7 |
| 8,284,945 B2 * | 10/2012 | Breyel | G06F 11/1458 | 380/284 |
| 8,656,077 B2 * | 2/2014 | Miloushev | G06F 9/5016 | 710/104 |
| 8,874,477 B2 * | 10/2014 | Hoffberg | G06Q 10/0631 | 705/37 |
| 8,971,533 B2 * | 3/2015 | Wall | H04W 12/04 | 380/255 |
| 9,634,999 B1 * | 4/2017 | Marion | G06F 21/6227 | |
| 2002/0021805 A1 * | 2/2002 | Schumann | G06F 21/10 | 380/201 |
| 2002/0083327 A1 * | 6/2002 | Rajasekaran | G06F 21/62 | 713/182 |
| 2002/0141575 A1 * | 10/2002 | Hird | G06F 21/62 | 380/44 |
| 2002/0157029 A1 * | 10/2002 | French | G06F 21/31 | 726/21 |
| 2004/0148502 A1 * | 7/2004 | Gollner | G06F 8/41 | 713/167 |
| 2005/0010751 A1 * | 1/2005 | Nahlinder | H04L 63/0442 | 713/150 |
| 2005/0043997 A1 * | 2/2005 | Sahota | G06Q 20/10 | 705/16 |
| 2006/0101266 A1 * | 5/2006 | Klassen | G06Q 20/347 | 713/170 |
| 2006/0290466 A1 * | 12/2006 | Kamiya | G07C 9/00309 | 340/5.6 |
| 2007/0005972 A1 * | 1/2007 | Mizikovsky | H04L 63/061 | 713/171 |
| 2007/0136211 A1 * | 6/2007 | Brown | G07F 7/1083 | 705/75 |
| 2008/0208759 A1 * | 8/2008 | Royyuru | G06Q 20/4012 | 705/72 |
| 2008/0267399 A1 * | 10/2008 | Medvinsky | H04L 9/0841 | 380/201 |
| 2008/0295144 A1 * | 11/2008 | Cam-Winget | H04L 63/08 | 726/1 |
| 2009/0133122 A1 * | 5/2009 | Koo | H04L 63/1416 | 726/23 |
| 2009/0147949 A1 | 6/2009 | Kirovski | | |
| 2009/0177892 A1 * | 7/2009 | Steeves | G06F 21/34 | 713/185 |
| 2009/0313687 A1 * | 12/2009 | Popp | H04L 9/3228 | 726/9 |
| 2010/0325443 A1 * | 12/2010 | Mattsson | G06F 21/6218 | 713/189 |
| 2011/0060913 A1 * | 3/2011 | Hird | G06F 21/34 | 713/184 |
| 2011/0131415 A1 * | 6/2011 | Schneider | H04L 9/3226 | 713/171 |
| 2011/0154041 A1 * | 6/2011 | Godfrey | H04W 12/04 | 713/171 |
| 2011/0202984 A1 * | 8/2011 | Hird | G06F 21/31 | 726/7 |
| 2011/0258452 A1 * | 10/2011 | Coulier | G06F 21/31 | 713/171 |
| 2011/0261961 A1 * | 10/2011 | Dharmaraju | H04W 12/04 | 380/277 |
| 2012/0066504 A1 * | 3/2012 | Hird | G06F 21/31 | 713/183 |
| 2012/0155643 A1 * | 6/2012 | Hassan | H04L 9/083 | 380/270 |
| 2012/0233675 A1 * | 9/2012 | Hird | H04L 63/0838 | 726/6 |
| 2012/0311322 A1 * | 12/2012 | Koyun | G06O 20/3227 | 713/156 |
| 2013/0111598 A1 * | 5/2013 | Marcovecchio | H04L 67/34 | 726/26 |
| 2013/0129091 A1 * | 5/2013 | Kang | H04W 12/04 | 380/270 |
| 2013/0276082 A1 * | 10/2013 | Kuang | H04L 63/0869 | 726/7 |
| 2013/0332736 A1 * | 12/2013 | Kawamura | H04L 9/0869 | 713/171 |
| 2014/0123304 A1 * | 5/2014 | Rachlin | G06F 21/6254 | 726/26 |
| 2014/0359292 A1 * | 12/2014 | Kawamura | H04L 9/0866 | 713/168 |
| 2015/0019442 A1 * | 1/2015 | Hird | G06Q 20/3829 | 705/71 |
| 2015/0052064 A1 * | 2/2015 | Karpenko | G06Q 20/3829 | 705/71 |
| 2015/0371230 A1 * | 12/2015 | Greenspan | G06Q 20/407 | 705/44 |
| 2016/0020906 A1 * | 1/2016 | Nolte | G06F 21/83 | 705/71 |
| 2016/0078437 A1 * | 3/2016 | Tahon | H04L 9/14 | 705/77 |
| 2016/0119307 A1 * | 4/2016 | Zollinger | H04L 63/08 | 726/4 |
| 2016/0162883 A1 * | 6/2016 | Liscia | G06K 19/06206 | 705/71 |
| 2016/0189138 A1 * | 6/2016 | Hird | G06Q 20/385 | 705/41 |
| 2016/0232523 A1 * | 8/2016 | Venot | G06Q 20/322 | |
| 2016/0239929 A1 * | 8/2016 | Hudson | G06Q 50/06 | |
| 2016/0352706 A1 * | 12/2016 | Peeters | H04L 9/0861 | |
| 2017/0019385 A1 * | 1/2017 | Yoo | H04L 63/061 | |
| 2017/0127282 A1 * | 5/2017 | Hassan | H04L 9/083 | |
| 2018/0124028 A1 * | 5/2018 | Fujimoto | G06F 21/44 | |
| 2018/0351928 A1 * | 12/2018 | Yoo | H04L 63/062 | |
| 2019/0013937 A1 * | 1/2019 | Leong | H04L 63/04 | |

(56) References Cited

U.S. PATENT DOCUMENTS

OTHER PUBLICATIONS

Ceipidor ET AL ( protocol for mutual authentication between NFC phones and POS terminals for secure payment transactions ) (Year: 2012).*
Extended European Search Report Corresponding to European Patent Application No. 14 17 6472; Date of Completion: Jul. 20, 2015; 12 pages.
European Search Report Corresponding to European Patent Application No. 14 17 6472; Date of Completion: Feb. 12, 2015; 4 pages.
Wikipedia "Derived unique key per transaction", Sep. 7, 2009, Retrieved from the Internet at URL: http://en.wikipedia.org/w/index.php?title=Derived_unique_key_per_transaction&oldid=312404635.
American National Standard for Financial Services, "ANS X9.24-1:2009, Retail Financial Services Symmetric Key Management Part 1: Using Symmetric Techniques", Oct. 13, 2009, 91 pages.

* cited by examiner

PRE-GENERATION OF SESSION KEYS FOR ELECTRONIC TRANSACTIONS AND DEVICES THAT PRE-GENERATE SESSION KEYS FOR ELECTRONIC TRANSACTIONS

BACKGROUND

With the proliferation of mobile devices, the card payment industry is moving toward payment using the equivalent of a chipcard stored on the mobile device. For mobile payment, the same data and algorithms can be stored on a mobile device, and the payment credential is still called a "card" even though is no longer physically resides in a plastic card. As used herein, the word "card" means this type of card on a mobile device.

The "Europay, Mastercard and Visa" (EMV) consortium has defined specifications for mobile cards that work within a secure payment infrastructure. All major card brands, including Visa, Mastercard, American Express, Discover, etc., have developed card specifications that derive from the EMV specifications.

In some variants, the card contains secret cryptographic keys that are stored securely and that are used to digitally sign transaction data relating to a potential transaction, such as a credit card transaction or a debit card transaction. The digitally signed transaction data may be used to verify the transaction, which may provide enhanced security relative to a conventional credit/debit card transaction. Such a card can be used, for example, at a merchant point of sale (POS) terminal, an automatic teller machine (ATM) or other location that provides an NFC reader.

SUMMARY

Some embodiments provide methods of securing a transaction between a user terminal and a transaction terminal. The methods include generating a plurality of session cryptographic keys from a master cryptographic key and a respective plurality of possible values of a transaction counter, storing the plurality of session cryptographic keys and one of the respective plurality of values of the transaction counter in the user terminal, encrypting the plurality of session cryptographic keys to provide a plurality of encrypted session cryptographic keys, generating a cryptogram based on a first one of the plurality of encrypted session cryptographic keys and transaction data for the transaction, transmitting the cryptogram to the transaction terminal, updating the transaction counter, and deleting the first one of the plurality of encrypted session cryptographic keys from the user terminal after generating the cryptogram.

Encrypting the plurality of session cryptographic keys may include encrypting with a personal identification number.

Encrypting the plurality of session cryptographic keys may include camouflaging the plurality of session cryptographic keys.

Camouflaging the plurality of session cryptographic keys may include encrypting the plurality of session cryptographic keys in such a manner that decrypting any of the plurality of session cryptographic keys with an incorrect personal identification number produces a valid session cryptographic key.

The methods may further include providing the master cryptographic key in the user terminal, and deleting the master cryptographic key from the user terminal after generating the plurality of session cryptographic keys. Following deletion of the master cryptographic key from the user terminal, there may be no data remaining on the user terminal that can be reliably used to decrypt the remaining session cryptographic keys using the transaction data and the cryptogram.

The methods may further include providing the master cryptographic key in the user terminal, and deleting the master cryptographic key from the user terminal after generating the plurality of session cryptographic keys.

In some embodiments, the number of session cryptographic keys generated may include a number of possible values of the transaction counter, and in other embodiments, the number of session cryptographic keys generated includes less than a number of possible values of the transaction counter.

The master cryptographic key may include a plurality of cryptographic keys.

Generating the cryptogram may include applying a hash function to the transaction data and the first one of the encrypted session cryptographic keys.

Updating the transaction counter may include incrementing the transaction counter.

A user terminal according to some embodiments includes a processor, a memory coupled to the processor, and a communication module coupled to the processor. The processor is configured to generate a plurality of session cryptographic keys from a master cryptographic key and a respective plurality of possible values of a transaction counter, to store the session cryptographic keys, to encrypt the plurality of session cryptographic keys to provide a plurality of encrypted session cryptographic keys, to exchange transaction data relating to a proposed transaction with a transaction terminal, to generate a cryptogram based on a first one of the plurality of encrypted session cryptographic keys and the transaction data, to transmit the cryptogram to the transaction terminal using the communication module, to update the transaction counter, and to delete the first one of the plurality of encrypted session cryptographic keys from the user terminal.

Encrypting the session cryptographic keys may include encrypting the plurality of session cryptographic keys with a personal identification number.

The processor may be configured to camouflage the plurality of session cryptographic keys in such a manner that decrypting any of the plurality of encrypted session cryptographic keys with an incorrect personal identification number produces a valid session cryptographic key.

A provisioning server according to some embodiments includes a processor, a memory coupled to the processor, and a communication module coupled to the processor. The processor is configured to generate a plurality of session cryptographic keys from a master cryptographic key and a respective plurality of possible values of a transaction counter, and to transmit the plurality of session cryptographic keys and the transaction counter to a user terminal for use in securing a financial transaction.

The session cryptographic keys may include first session cryptographic keys, wherein the number of first session cryptographic keys includes less than a number of possible values of the transaction counter, and the processor may be further configured to generate additional session cryptographic keys and transmit the additional session cryptographic keys to the user terminal when the supply of first session cryptographic keys at the user terminal is reduced to a predetermined level.

Some embodiments provide methods including generating a plurality of secret items corresponding to a respective plurality of possible values of an index, storing the plurality of secret items and a first one of the plurality of possible values of the index in a first terminal, generating a message corresponding to the first one of the plurality of possible values of the index using a first one of the secret items, transmitting the message to the second terminal, updating the index, and deleting the first one of the plurality of secret items from the first terminal after generating the message. The plurality of secret items may be one time passwords. The index may be a transaction index, and the message may be a transaction digest for a transaction between the first terminal and the second terminal.

Related computer program products are disclosed. It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

In recent years, the EMV consortium has designed a payment solution whereby the card data and algorithms can be stored on a user terminal, such as a mobile device, instead of in a card. In this context, the user terminal may include a mobile device, such as a mobile telephone, smartphone, tablet, laptop, personal digital assistant (PDA) or any other mobile computing device. However, the term "user termi-nal" is not limited to mobile or wireless computing devices. The payment credential on the mobile device may still be called a "card" for convenience.

For simplicity, the following discussion will be limited to a description of point of sale purchases. However, the description is equally applicable to ATM and similar transactions.

Figure 1:
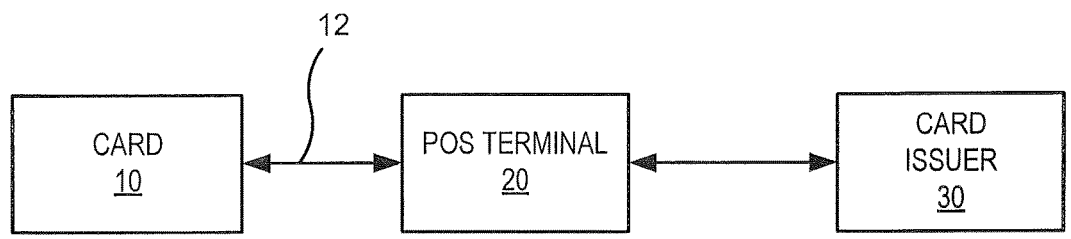
FIG. 1 is a block diagram illustrating card processing systems/methods including a card, a point of sale terminal and a card issuer.

Referring to FIG. 1, during a card purchase, a card 10 exchanges a plurality of messages with a Point-Of-Sale (POS) terminal 20 via a communication link 12. The card 10 and the POS terminal 20 negotiate whether the transaction will be performed, and if so, how it will be performed. Information received by the POS terminal 20 may be used to verify the transaction with the card issuer 30.

The card 10 may be an EMV card, i.e. any card that complies with the EMV standards, or other similar technology, or any other card that includes a processor and memory.

To communicate with a merchant POS terminal, a user terminal may use near field communications (NFC) instead of the physical electrical contact used for a card. Near field communication (NFC) is a set of standards that enable short-range, bidirectional wireless communication between devices by touching them together or bringing them into close proximity, usually no more than a few inches. NFC standards cover communications protocols and data exchange formats, and are based on existing radio-frequency identification (RFID) standards.

Figure 2:
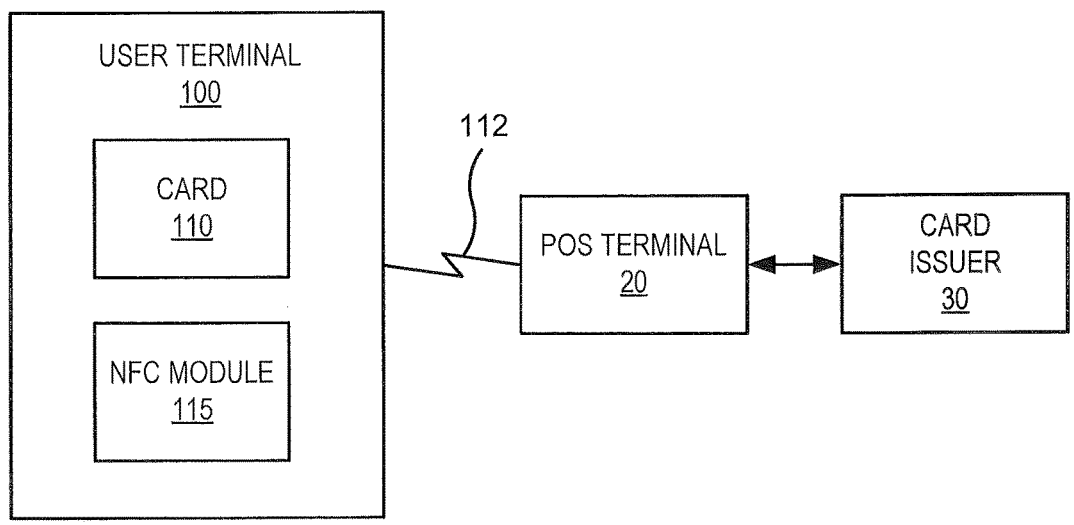
FIG. 2 is a block diagram illustrating card processing systems/methods including a card in a user terminal, a point of sale terminal and a card issuer.

Referring to FIG. 2, a user terminal 100 may include electronic payment credentials, i.e. a "card" 110 stored in a memory of the terminal 100, and an NFC module 115. The NFC module may include a transceiver and associated software and/or firmware that enables the user terminal 100 to engage in NFC communications. To use the NFC-enabled user terminal 100 to conduct a transaction, the mobile device 100 may be placed against (or close to) the POS terminal 20 for several seconds, during which time a wireless communication path 112 is established between the mobile device 100 and the POS terminal 20. The transaction may be negotiated between the card 110 and the POS terminal using the wireless communication path 112.

Other types of wireless communication protocols, such as Bluetooth and Wi-Fi may be used to establish the wireless communication path 112.

As noted above, the electronic payment credentials in the card 110 may include cryptographic keys that are used to digitally sign transaction data for verification/authentication purposes. For security purposes, it is generally not desirable to store this sensitive data in a normal memory that may be subject to tampering or hacking. Instead, cards are typically stored within a "Secure Element" (SE), which is a tamper-resistant chip that provides secure data storage along with a cryptographic microprocessor to facilitate transaction authentication and security, and provide secure memory for storing payment applications. Payment applications can also run within the Secure Element.

However, it may be impractical or otherwise undesirable to include or use a Secure Element in a mobile device. This leads to a potential problem, in that a cryptographic key stored in a mobile device may be compromised if the mobile device is lost or stolen. Some embodiments provide methods of generating, storing and/or using cryptographic keys in such a manner that they are less likely to be compromised even if they are not stored in a Secure Element or similar environment.

Some embodiments are described herein in the context of an EMV-compliant payment transaction at a merchant Point of Sale (POS) terminal using near field communications (NFC). However, it will be appreciated that the embodiments described herein may be used in connection with ATM transactions, unattended kiosk or vending machine transactions, and other similar transactions. Moreover, there are many protocol variations on EMV for NFC transactions. The embodiments described herein may be employed with other protocols or standards.

Moreover, although described in conjunction with mobile devices that are configured to communicate over wireless interfaces, it will be appreciated that some embodiments may be applicable to other types of user terminals. A user terminal may include any computing device.

Referring again to FIG. 2, to conduct a transaction, a user may select a card 110 from among a plurality of cards stored in a user terminal 100. The customer may then hold the user terminal 100 near the merchant POS terminal 20. The POS terminal 20 and the user terminal 100 start a session where they communicate over an NFC interface 112. The card 110 and the POS terminal 20 exchange messages according to the EMV protocol. Included in these messages is data identifying the card (card data), data identifying the terminal (terminal data), other transaction data, and data output by transaction algorithms running on the POS terminal 20 and the card 110. The card data may include, for example, the Primary Account Number (PAN) of the card 110, the cardholder name, expiration date, etc. The terminal data may include a terminal country code, etc. The other transaction data may include the date, transaction type, transaction amount, etc. The card data, the terminal data and/or the other transaction data, or any portions of these items, can be referred to generally as "transaction data."

Using the transaction data, the card 110 and the POS terminal 20 negotiate the manner in which the transaction will proceed. The POS terminal 20 may use the transaction data to authorize the transaction with the card issuer 30.

Figure 3:
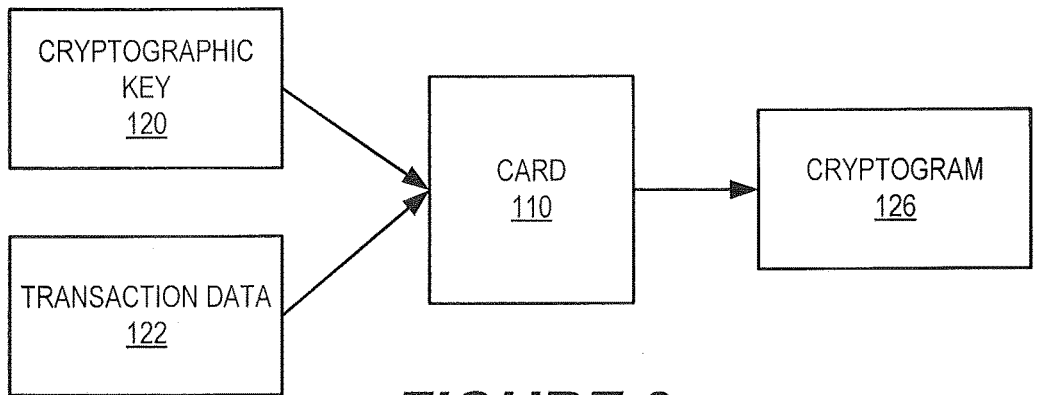
FIG. 3 is a block diagram illustrating the generation of a transaction cryptogram by a card.

Referring to FIG. 3, in the process of conducting the transaction, the card 110 may generate a cryptogram 126, which is an encrypted message that is a form of transaction digest that can be used to authenticate the transaction to the card issuer 30. The cryptogram is generated by encoding transaction data 122 using a cryptographic key 120 stored in the user terminal 100.

The cryptographic keys, or "financial keys" may include, in some embodiments, keys of the form: a symmetric key (such as a 3DES key or an Advanced Encryption Standard (AES) key), a secret, a secret byte array, a seed, and/or a controlled datum.

For cryptogram generation, early versions of EMV used a single financial key, or cryptogram key (CK), which is a 16 byte key (composed of two DES keys). The relevant data is combined, hashed, and encrypted using the CK, to form the cryptogram.

Later versions of EMV use a 16 byte "Application Cryptogram Master Key" (MK), and from that generate a 16 byte "Application Cryptogram Session Key" (SK), for each transaction. The session key is a secret item that is stored in the card. The session key, which is different for every transaction, is used to generate a cryptogram in much the same way as the original CK was used. There are several different algorithms in use for generating a session key from a master key.

A cryptogram is typically an 8 byte value that can be understood as a signature on transaction data. The card 110 generates the cryptogram by encoding the transaction data 122 with the cryptographic key 120 using a hash function that takes the transaction data and the cryptographic key as inputs and generates the cryptogram as an output. The hash function used to generate the cryptogram is a one-way mathematical function. That is, the cryptographic key and the transaction data cannot be recovered from the cryptogram. Also, the cryptogram is unique to the particular transaction data and cryptographic key that are used.

Thus, assuming the card issuer 30 knows the cryptographic key used by the card 110, once the card issuer 30 has been provided the transaction data by the POS terminal 20, the card issuer can verify that the card 110 generated the cryptogram by generating the cryptogram from the transaction data using the known cryptographic key and comparing it to the cryptogram that was generated by the card 110.

Figure 4:
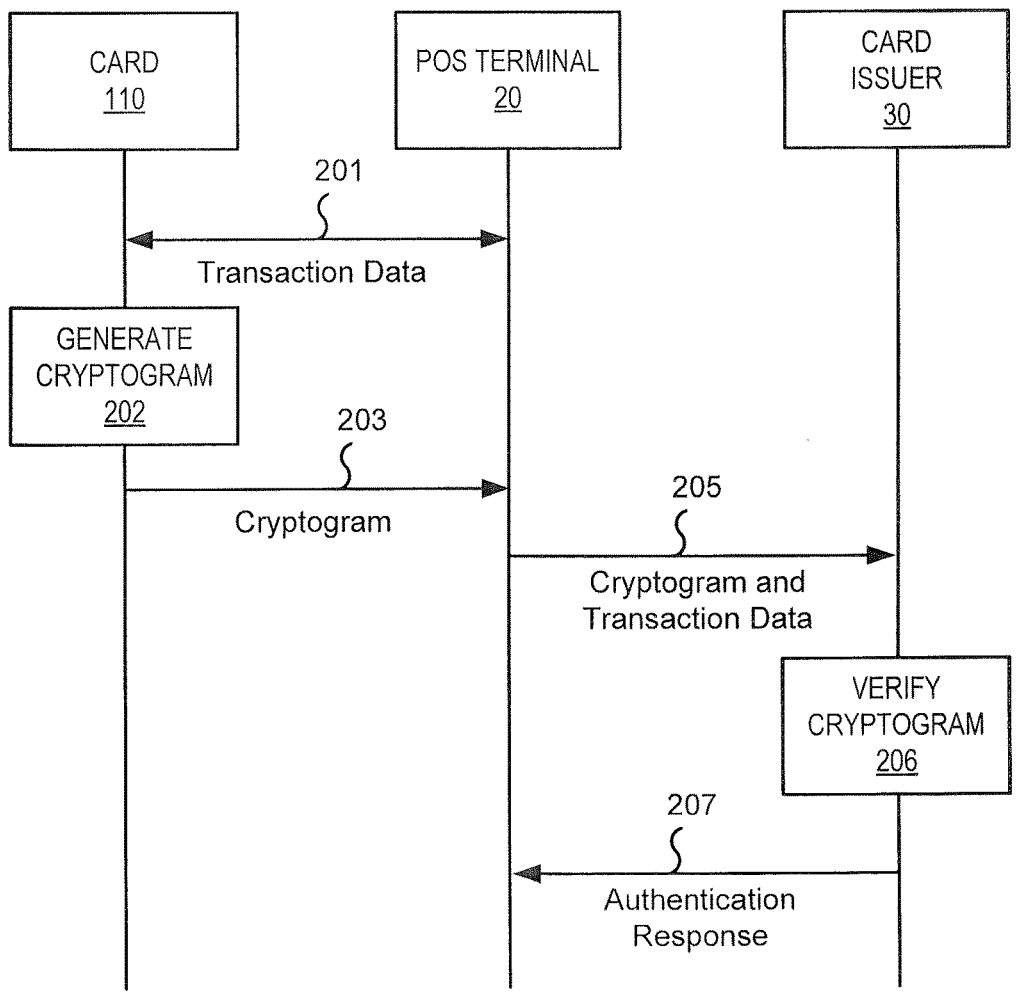
FIG. 4 is a diagram illustrating the authentication of a card transaction.

Referring to FIG. 4, to conduct a transaction, a card 110 and a POS terminal may exchange transaction data in a series of messages 201. The card 110 may then generate a cryptogram from the transaction data using the stored cryptographic key (block 202). The card 110 transmits the cryptogram to the POS terminal 20 over the NFC link in a message 203. To authenticate the transaction, the POS terminal 20 may then transmit the cryptogram and the transaction data to the card issuer 30 in a message 205.

The card issuer may verify the cryptogram by generating a trial cryptogram using the transaction data provided by the POS terminal 20 and its stored or regenerated copy of the cryptographic key (block 206). Based on the outcome of the verification process, the card issuer will provide an authentication response 207 to the POS terminal 20.

As noted above, the cryptographic keys may be stored in a Secure Environment (SE). The Secure Environment may be protected by a Personal Identification Number (PIN). Thus, when the user opens the payment application on the user terminal 100, the user must enter a PIN, which is checked by the Secure Environment before being given access to the cards stored on the user terminal. The user then chooses a card and executes the transaction. The cryptographic keys should never leave the Secure Environment. If a thief steals a user's user terminal, the thief cannot use the cards without knowing the PIN. If the attacker attempts a "brute force" attack by trying all possible PINs one after another, the attacker will usually fail, because the Secure Environment will lock up after a pre-set number of failed attempts.

NFC communications are typically not encrypted. Although NFC communication is intended to occur over small distances of around several centimeters, it is possible to read this traffic over larger distances using a sensitive receiver. However, even if an attacker intercepts the EMV protocol messages containing transaction data, the attacker will not be able to deduce the values of the cryptographic keys from the cryptogram and the transaction data.

Many user terminals do not have a Secure Environment. Moreover, even in user terminals that include a Secure Environment, it may not be desirable or possible for a given application to use the Secure Environment because access to the Secure Environment may be restricted, for example, by the user terminal's operating system, manufacturer or wireless service provider.

Thus, it may be desirable to store card data, including cryptographic keys, in normal application storage space on a user terminal. This creates a problem, however, in the event the user terminal is lost or stolen, as it would usually be possible (although difficult) to read the card data on the user terminal.

Suppose, for example, that the financial keys (and other card data) were encrypted using a PIN, and stored in application memory. An attacker having possession of the user terminal could institute a brute force attack against the data. In a brute force attack, an attacker can try every possible PIN in turn until well-formed data is revealed, with no error reported.

A further form of protection of the financial key (CK or MK) has been developed that uses cryptographic camouflage as described, for example, in U.S. Publication No. 2011/0060913, the disclosure of which is incorporated herein by reference.

Essentially, cryptographic camouflage operates by carefully encrypting the financial key in a manner such decrypting the key with any possible PIN will reveal a valid-looking key, with no error report. Only by attempting a transaction will an attacker find out if the correct PIN has been guessed. The card issuer can lock the account after a pre-set number of attempts, thus nullifying the brute-force attack.

However, there is a further attack that can defeat this protection mechanism in the context of contactless (wireless) communication between the user terminal and the POS terminal. If an attacker records the wireless exchange between the user terminal and the POS terminal, and then subsequently gains access to the user terminal, the attacker will possess the transaction data and the cryptogram from the NFC exchange and will also possess the camouflaged keys on the phone.

The attacker can then run a brute force attack in which for each possible PIN, the attacker decamouflages the cryptographic key, generates a trial cryptogram from the transaction data, and compares the trial cryptogram to the actual cryptogram captured from the NFC exchange. If the trial cryptogram and the actual cryptogram match, the attacker knows that the right PIN, and therefore the right cryptographic key, has been found.

Early EMV-style algorithms for generating a cryptogram used the cryptographic key CK directly to encrypt some data and produce the cryptogram. Recently, more elaborate algorithms have been designed that do not use the cryptographic key directly. Rather, the cryptographic key is treated as a "Master Key" (MK), and for each transaction a "Session Key" (SK) is generated from the Master Key. The Session Key is used in the cryptogram generation algorithm.

The EMV algorithm named "CSK" has been adopted by several important card specifications for the generation of session keys from the master key. The EMV CSK algorithm takes the master key MK and a transaction counter, such as the EMV-defined Application Transaction Counter (ATC), as inputs and generates a session key SK as an output by constructing various byte sequences and encrypting them with the master key, and then choosing certain output bytes to become the session key. The ATC is a counter that is maintained by both the user terminal and the card issuer to keep track of the number of transactions initiated by the user terminal. In particular, the ATC is a counter that begins at zero and is incremented once for every transaction. The ATC is stored in 2 bytes, and so supports 65536 purchases (though EMV does support resetting the ATC via an authenticated procedure involving a different financial key). Thus, each session key is associated with a unique value of the ATC. Another transaction counter may be used instead of the EMV-defined ATC.

The passive protocol interception attack described above works regardless of whether the card uses a single cryptographic key, or uses the session key alternative. In the case of session keys, the attacker may decamouflage the master and use it to generate the session key(s), which are used in turn to generate trial cryptograms as before.

Some embodiments provide an approach that can overcome security concerns over storing card data, including cryptographic keys, on a user terminal. According to some embodiments, the cryptographic keys may be protected on the device, in software, in a manner that decreases the possibility that the financial keys can be compromised, even if the user terminal is stolen.

According to some embodiments, a master cryptographic key and a transaction counter are provided. A plurality of session cryptographic keys are generated from the master cryptographic key and a respective plurality of possible values of the transaction counter. The session cryptographic keys are encrypted to provide a plurality of encrypted session cryptographic keys, which are stored in the user terminal. The master cryptographic key is then deleted from the user terminal.

During a transaction, a cryptogram is generated based on one of the encrypted session cryptographic keys and transaction data for the transaction. The cryptogram is transmitted to the transaction terminal. The transaction counter is updated, and the encrypted session cryptographic key is deleted from the user terminal. Thus, even if an attacker intercepts the transaction data and cryptogram from a NFC communication, neither the session key used to form the cryptogram, nor the master key used to generate the session key, can be obtained from the user terminal.

Figure 5:
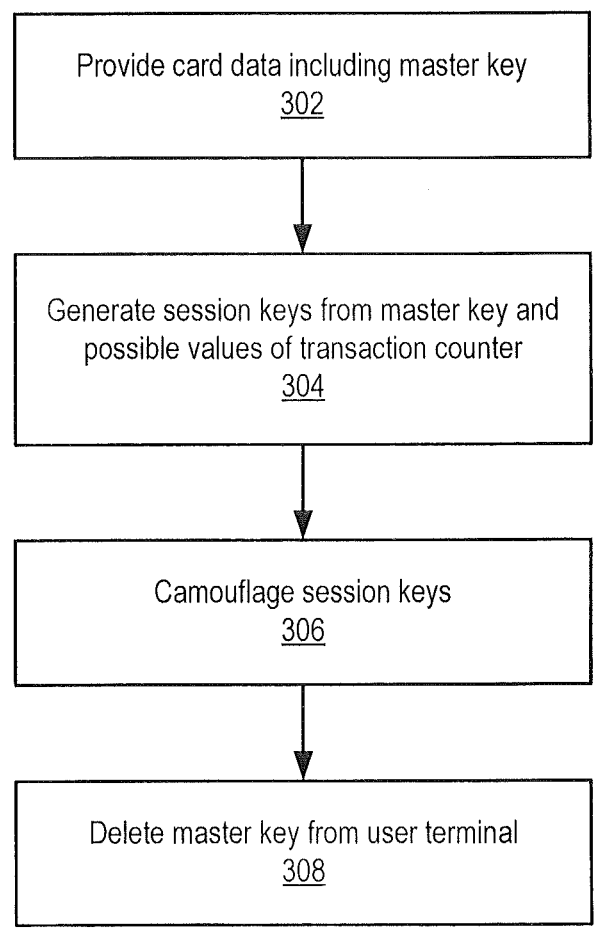
FIGS. 5 and 6 are flowcharts illustrating systems/methods according to various embodiments.

As an example, referring to FIGS. 2 and 5, a master key is provided (block 302). For example, in some embodiments, a user may download card data for a card 110 including a master key onto a user terminal 100. In other embodiments, a master key may be provided at a provisioning server operated by the card issuer.

According to some embodiments, the provisioning server or the user terminal 100 iterates through a number of possible values of the transaction counter (possibly including all possible values of the ATC), and generates a number of session keys using the transaction counter values and the master key (block 304). In some embodiments, the session keys may be pre-generated by, for example, a provisioning server operated by the card issuer 30, and subsequently provided to the user terminal 100. Thus, the user terminal 100 need not actually generate the session keys, and the master key may not be stored on the user terminal 100, thereby increasing the security of the master key.

The session keys generated in this manner may be stored on the user terminal in regular application memory. The session keys may occupy very little memory relative to the amount of memory available in modern devices. For example, 365 session keys may occupy only about 6 kilobytes of memory. Moreover, given the processing power available to modern computing devices, the time required to generate the session keys may be negligible. Thus, the card 110 may in some embodiments generate a number of session keys that are expected to be used in the lifetime of the card 110. In some cases, a number of session keys equal to the total possible number of ATC values (e.g., 65,536 session keys) may be generated and stored on the user terminal 100. The session keys may be stored in a regular memory of the user terminal 100 or, if it is available, in a secure memory of the user terminal 100. This number of session keys may occupy about 1 MB of memory in the user terminal.

In some embodiments, no session keys may be stored on the user terminal, and a user could connect to a provisioning server and acquire a session key as needed (either by receiving the master key temporarily, or by having the provisioning server generate the session key), and delete the session key immediately afterward. Note that this would require the user to be online at the time of the transaction.

This approach would defeat a protocol message interception attack also for the older fixed CK method that uses no session keys.

The ATC is stored in 2 bytes. However, EMV standards include resetting or "rolling over" the ATC after the maximum value has been attained. In this event, the supply of SKs may be replenished using one of the above methods.

The new session keys may be optionally camouflaged in the manner described in the above-referenced U.S. Publication No. 2011/0060913 (block 306). In particular, the session keys may be camouflaged as described in more detail below.

The user terminal then deletes the master key (block 308) if it was provided to the user terminal.

At this point, the user terminal has stored (possibly in camouflage) a number of session keys that can be used in transactions with associated transaction counter values.

Figure 6:
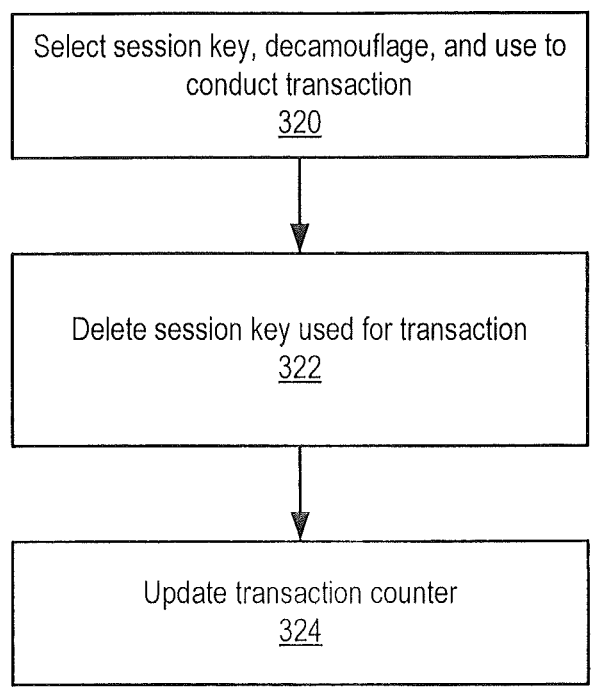

Operations for conducting a transaction are illustrated in FIGS. 2 and 6. As shown therein, when the user wishes to conduct a transaction and enters the appropriate PIN, the user terminal 100 selects a the correct session key from among the pre-stored session keys based on the current value of the transaction counter, decamouflages the session key as necessary, and uses the session key to conduct the transaction with a POS terminal 20 (block 320).

After the transaction, the user terminal deletes the session key (block 322) and updates the transaction counter (block 324). The master key and the used session key may be deleted using a protocol that renders the session key unable to be recovered from the user terminal. For example, the session key may be erased using well-known secure data erasure techniques in which pseudorandom data is repeatedly overwritten onto to the physical memory location at which the session key was stored.

This approach may be highly resistant to the passive protocol interception/brute force attack described above, as the attacker cannot use trial PINs to reproduce the session key corresponding to a previous transaction. That is, because the master key and the used session key have been erased, they are not available for the attacker to use in an attempt to recreate the cryptogram and recover the PIN. Moreover, because the remaining session keys are camouflaged, the attacker cannot reliably guess the remaining session keys, even if the attacker has knowledge of the transaction data and cryptogram used for a previous transaction.

In some embodiments, the card issuer can pre-generate the session keys and provide them to the user terminal. Any number of session keys may be pre-generated in this manner. For example, in some embodiments a lifetime number of session keys may be pre-generated. In other embodiments, a number of session keys corresponding to the number of possible values of the transaction counter may be pre-generated. In still other embodiments, a limited number of session keys may be pre-generated, and additional session keys may be provided to the uses terminal at a later time either by providing the session keys to the user terminal directly or by providing the master key (or a new master key) to the user terminal and allowing the user terminal to generate more session keys from the master key.

The session keys may be derived at any time before the transaction in which they are used. That is, any algorithm in which the session key generation algorithm takes the master key and other input data that can be derived before the current transaction as long as the master key and the other input data are known. Session keys can therefore be generated when the user terminal is originally provisioned. However, any approach other than generating all of the session keys at provisioning time may involve keeping the master key on the provisioning server, or providing access to it.

Figure 7:
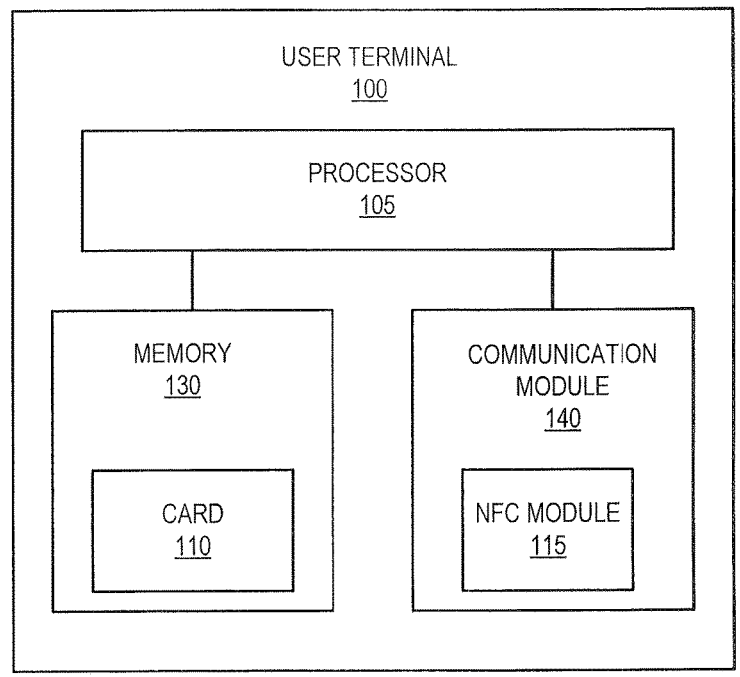
FIG. 7 is a block diagram of a user terminal according to some embodiments.

FIG. 7 is a block diagram of a user terminal 100 in accordance with some embodiments. The user terminal 100 includes a processor 105, and a memory 130 and communication module 140 coupled to the processor. The memory 130 stores the card 110 as well as processing routines that configure the processor to perform the operations described above in connection with FIGS. 4 to 6. The communication module 140 may include a near field communication (NFC) module 115 that enables the user terminal 100 to communicate with the POS terminal 20 over the wireless communication path 112 shown in FIG. 2. The NFC module may include a transceiver and associated software and/or firmware that enables the user terminal 100 to engage in NFC communications.

Figure 8:
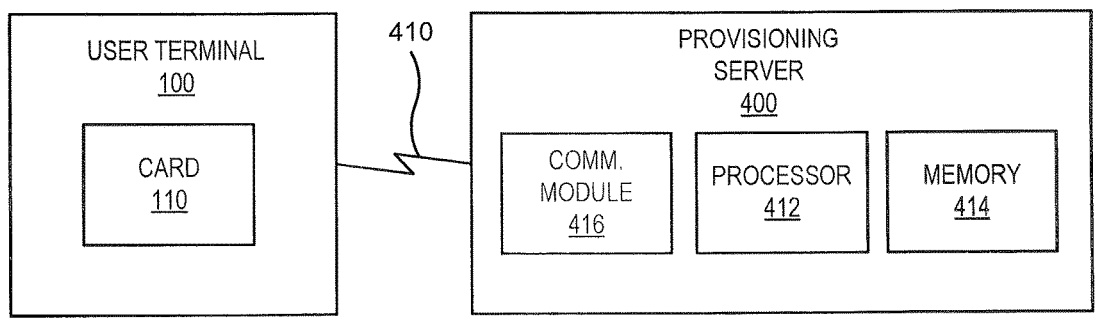
FIG. 8 is a block diagram illustrating a provisioning server according to some embodiments.

FIG. 8 is a block diagram of a provisioning server 400 that may be operated, for example, by a card issuer. Some operations described herein may be performed by the provisioning server 400 when a card is activated/issued. For example, the provisioning server 400 may generate session keys to be used by a user terminal and transmit the session keys to the user terminal. The provisioning server 400 includes a processor 412, a memory 414 and a communication module 416. The communication module 416 may include a transceiver and associated software/firmware enable to the provisioning server 400 to communicate with a user terminal 100 over a communication link 410 that may include, for example, a packet-switched data communication network, such as the Internet. The memory 414 may store routines that enable the processor 412 to generate session keys for the user terminal 100, which may be provided to the user terminal 100 over the communication link 410.

Figure 9:
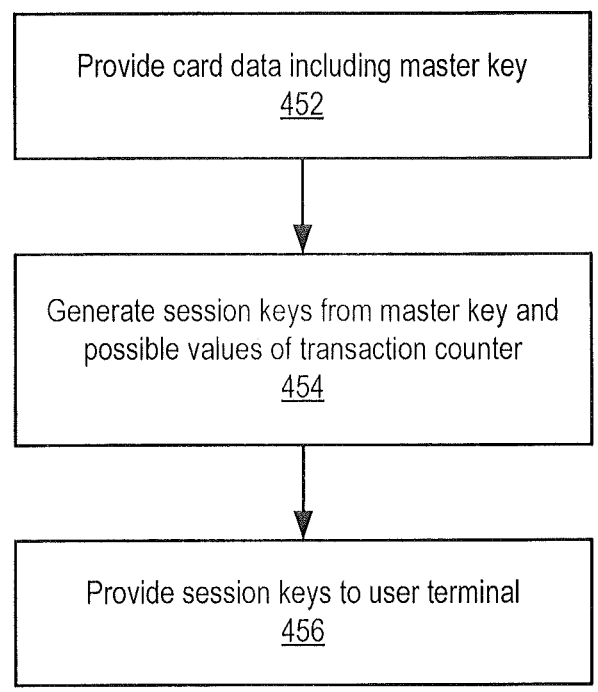
FIG. 9 is a flowchart illustrating provisioning systems/methods according to various embodiments.

For example, the provisioning server may be configured to perform the operations shown in FIG. 9. As shown therein, when a card 110 is downloaded to a user terminal 100 (see FIG. 2), or subsequently when a card 110 is to be updated with new session keys, the provisioning server is provided with card data for the card, including a master key (block 452). The master key may be a master key that was previously used to generate session keys for the card 110, or may be a new master key.

The provisioning server 400 generates session keys from the master key and from possible values of a transaction counter maintained by both the user terminal 100 and the card issuer (block 452). The provisioning server 400 then provides the generated session keys to the user terminal 100, for example over the communication link 410 (block 456).

The provisioning server 400 may be further configured to generate additional session cryptographic keys and transmit the additional session cryptographic keys to the user terminal when the supply of session cryptographic keys at the user terminal is reduced to a predetermined level, such as, for example, to less than ten percent of the original number of session cryptographic keys stored at the user terminal.

Camouflaging the session keys will now be described in more detail. A single 16 byte session key is internally composed of two 8 byte DES keys. Each byte of a DES key consists of 7 more-or-less random bits, plus one "parity" bit that functions as a kind of checksum, and is usually ignored. The parity bit in each byte, should be randomized, though most CSK style algorithms will not set the parity bits anyway, and will leave them in a pseudo-random state, which case nothing need be done. A may be encrypted using a PIN in such a way that any decryption under any trial PIN will produce a valid looking session key (i.e., no test can prove that the decrypted session key is invalid). One possible way of camouflaging the session key is to input the PIN to a mask-generation function and produce 16 byte mask that is then XOR-ed with session key.

Figure 10:
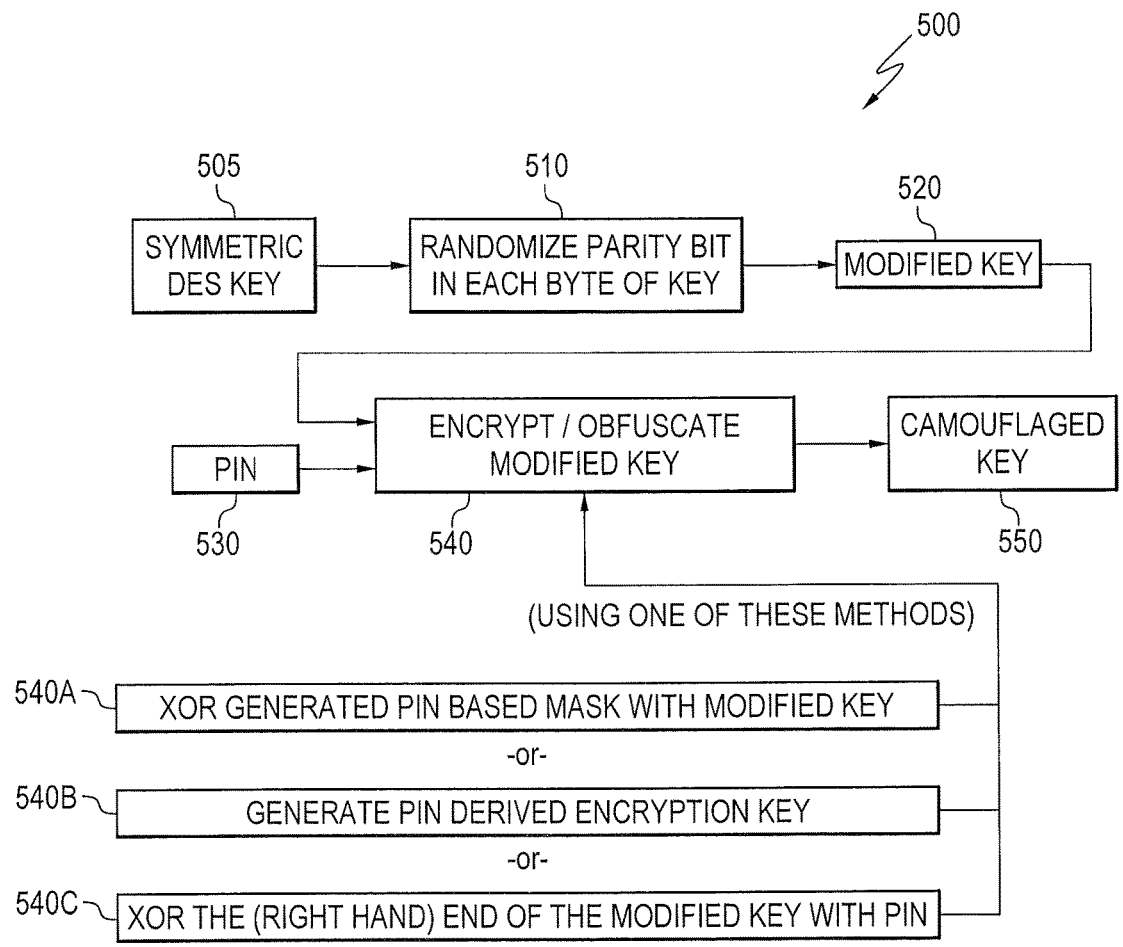
FIG. 10 is a flowchart illustrating operations for generating a camouflaged session key according to some embodiments.

FIG. 10 illustrates a method 500 to cryptographically camouflage a session key based on FIG. 2 of the above-referenced U.S. Publication No. 2011/0060913. A single 16 byte EMV session key SK is in fact composed of two 8 byte DES keys. To camouflage a session key it suffices to camouflage each DES key, and accordingly the following discussion describes how a single DES key can be camouflaged. At block 505, a symmetric key is provided to a camouflaging process. In the embodiments illustrated in FIG. 10, the key provided at block 505 may be of any symmetric key type, for example, the key may be a Data Encryption Standard (DES) key which is provided for camouflaging under a PIN. The DES key is of size 8 bytes. In each byte, bits 2 through 8 are random, and the first bit is a parity bit which is the parity of bits 2 through 8. In block 510, the parity bit in each byte of DES key 505 is randomized, to produce a modified key at block 520. A PIN is provided at block 530, and the modified key is encrypted or obfuscated at block 540 using the PIN, to provide a camouflaged key at block 550.

The method of encryption used at block 540 may be one of various methods. By way of non-limiting example, three possible methods 540A, 540B, 540C are shown in FIG. 10. Method 540A uses a Mask Generation Function, such as MGF1 from the PKCS #1 standard, to create a mask from PIN 530 and XOR (Exclusive OR) the mask with the modified key to provide a camouflaged key at block 550. Method 540B encrypts the modified key with a new key derived from the PIN to provide a camouflaged key at block 550. When using method 540B, no padding or other information should be stored that can help an intruder recognize a failed decryption attempt with a wrong PIN, e.g., a PIN other than the PIN provided at block 530. While some possible methods are described herein to encrypt or obfuscate a modified key to provide a camouflaged key, it is understood that various alternative methods and embodiments can be employed for encrypting a modified key to provide a camouflaged key.

Note that an attacker using a brute force attack with all possible PINs, and with full knowledge of the camouflage algorithm used at block 540, will always produce a validly formatted DES key, except for the parity bits. The attacker has no way of recognizing when the correct PIN was used. According to some embodiments, structure, if any, should be removed from the datum to be encrypted/obfuscated. This applies to the parity bits, in the case of DES keys, as described for the embodiment shown in FIG. 10. However, it is understood that a camouflaging technique based on the method described in FIG. 10, e.g., a combination of modifying a key and encrypting or obfuscating the modified key using a PIN can be used for any other standard symmetric key, for example, an Advanced Encryption Standard (AES) key.

As described above, the EMV cryptographic session key (CSK) generation mechanism uses a master key and the Application Transaction Counter to generate a session key for a transaction. Some session key generation algorithms also take an "Unpredictable Number" (UN) as an input. The UN is several bytes of more-or-less random data that comes from the merchant terminal and must be included in the transaction data used for the cryptogram. Different protocol versions use a different size UN. Further, it is possible that other data, in addition to or instead of the UN, may be needed to form the session key but not known until the time of the transaction.

Since the UN is not known until the time of the transaction, some embodiments pre-generate a session key for each possible potential UN for each possible value of the transaction counter. The number of future transactions (ATC values) supported in a pre-generation session can be chosen appropriately based on available computing and/or storage resources. For example, for a 2 byte UN, it is possible to pre-generate session keys for 365 ATC values in 15 minutes, requiring 360 MB of storage.

As noted above, all the major card brands have developed implementations of the EMV specification. For example, a recent Mastercard version of "PayPass" for mobile NFC payments using their "M/Chip" specifications describes two SK generation algorithms: the proprietary SKD, and the EMV CSK mechanisms. The older SKD mechanism takes the MK, ATC, and UN as inputs.

The PayPass specifications also describe the EMV 2000 mechanism for generating session keys corresponding to a different financial master key (not for generating cryptograms). Although the present discussion has focused on the cryptogram key, the methods described herein of pre-generating and camouflaging session keys would be applicable in this scenario as well.

More generally, the systems/methods for pre-generating and camouflaging session keys can be applied to many card payment systems where the card data and algorithms are stored on a device, and should not be considered to be limited to the specific examples described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of securing a transaction between a user terminal and a transaction terminal, comprising:
   generating, using a processing circuit of the user terminal, a plurality of session cryptographic keys from a master cryptographic key on the user terminal and based on a plurality of possible values of a transaction counter;
   securing the plurality of session cryptographic keys, wherein said securing comprises:
      deleting the master cryptographic key from the user terminal after generating the plurality of session cryptographic keys to prevent regeneration of the plurality of session cryptographic keys; and encrypting, using the processing circuit of the user terminal, the plurality of session cryptographic keys to provide a plurality of encrypted session cryptographic keys;

storing the plurality of encrypted session cryptographic keys and one of the plurality of possible values of the transaction counter in the user terminal;

generating, using the processing circuit of the user terminal after deleting the master cryptographic key from the user terminal, a cryptogram that is based on a first one of the plurality of encrypted session cryptographic keys and based on transaction data for the transaction;

transmitting the cryptogram to the transaction terminal over a computer network between the transaction terminal and the user terminal;

updating the transaction counter; and deleting the first one of the plurality of encrypted session cryptographic keys from the user terminal after generating the cryptogram.

2. The method of claim 1, wherein encrypting the plurality of session cryptographic keys comprises encrypting with a personal identification number.

3. The method of claim 2, wherein encrypting the plurality of session cryptographic keys comprises camouflaging the plurality of session cryptographic keys.

4. The method of claim 3, wherein camouflaging the plurality of session cryptographic keys comprises encrypting the plurality of session cryptographic keys in such a manner that decrypting any of the plurality of session cryptographic keys with an incorrect personal identification number produces a valid session cryptographic key.

5. The method of claim 4, wherein following deletion of the master cryptographic key from the user terminal, there is no data remaining on the user terminal that can be used to decrypt the remaining session cryptographic keys using the transaction data and the cryptogram without attempting a transaction with the transaction terminal.

6. The method of claim 1, wherein transmitting the cryptogram comprises transmitting the cryptogram to the transaction terminal using a near field communication link, a Bluetooth communication link, a Wi-Fi communication link, or other wireless communication link.

7. The method of claim 1, wherein the number of session cryptographic keys generated comprises a number of all possible values of the transaction counter.

8. The method of claim 1, wherein the number of session cryptographic keys generated comprises less than a number of all possible values of the transaction counter.

9. The method of claim 1, wherein the master cryptographic key comprises a plurality of cryptographic keys.

10. The method of claim 1, wherein generating the cryptogram comprises applying a hash function to the transaction data and the first one of the encrypted session cryptographic keys.

11. The method of claim 1, wherein updating the transaction counter comprises incrementing the transaction counter.

12. A computer program product for securing a transaction between a user terminal and a transaction terminal, comprising:

a non-transitory computer readable storage medium having computer readable program code embodied in the medium, the computer readable program code comprising:

computer readable program code to generate a plurality of session cryptographic keys from a master cryptographic key on the user terminal and based on a plurality of possible values of a transaction counter;

computer readable program code to secure the plurality of session cryptographic keys, wherein said securing comprises deleting the master cryptographic key from the user terminal after generating the plurality of session cryptographic keys to prevent regeneration of the plurality of session cryptographic keys;

computer readable program code to store the session cryptographic keys and one of the plurality of transaction counters in the user terminal;

computer readable program code to generate a cryptogram in response to deleting the master cryptographic key based on a first one of the plurality of session cryptographic keys and based on transaction data for the transaction;

computer readable program code to transmit the cryptogram to the transaction terminal;

computer readable program code to update the transaction counter; and computer readable program code to delete the first one of the plurality of session cryptographic keys from the user terminal after generating the cryptogram.

13. The method of claim 1, wherein generating the plurality of session cryptographic keys from the master cryptographic key on the user terminal and the plurality of possible values of the transaction counter comprises generating the plurality of session cryptographic keys for all possible values of the transaction counter.

14. The method of claim 12, wherein the computer readable program code to generate the plurality of session cryptographic keys from the master cryptographic key on the user terminal and the plurality of possible values of a transaction counter generates the plurality of session cryptographic keys for all possible values of the transaction counter.

* * * * *